United States Patent

[11] 3,616,144

| [72] | Inventor | Michael J. Kenney<br>Sutton Coldfield, England |
|---|---|---|
| [21] | Appl. No. | 651,552 |
| [22] | Filed | July 6, 1967 |
| [45] | Patented | Oct. 26, 1971 |
| [73] | Assignee | The Dunlop Company Limited<br>London County, England |
| [32] | Priority | July 21, 1966 |
| [33] | | Great Britain |
| [31] | | 32709/66 |

[54] WALL-COVERING ELEMENTS
15 Claims, 3 Drawing Figs.

[52] U.S. Cl. ........................................... 161/83,
156/41, 156/45, 161/87, 161/158
[51] Int. Cl. ........................................... B32b 5/02,
B32b 5/16
[50] Field of Search ........................................... 161/270,
265, 249, 162, 158, 87, 83, 43, 44; 117/100 RG;
156/39, 41, 44, 45, 62.2; 52/309

[56] References Cited
UNITED STATES PATENTS

| 3,235,441 | 2/1966 | George et al. | 161/162 |
|---|---|---|---|
| 2,991,267 | 7/1961 | Bean | 117/100 X |
| 2,806,811 | 9/1957 | Von Hazmburg | 156/39 X |
| 2,773,788 | 12/1956 | Magrane et al. | 161/270 X |
| 2,442,321 | 5/1948 | Cuppett | 156/39 X |
| 3,055,783 | 9/1962 | Hendrickson et al. | 161/43 |

*Primary Examiner*—Robert F. Burnett
*Assistant Examiner*—Mark A. Litman
*Attorney*—Stevens, Davis, Miller & Mosher ABSTRACT: A tile having a core portion of resin-bonded granular filler e.g. resin-bonded sand, and a resin-impregnated fibrous facing layer and backing layer. The facing layer provides the main strength of the tile and can carry high-quality designs. The core provides the bulk of the tile and as it is usually cellular it also provides insulating properties.

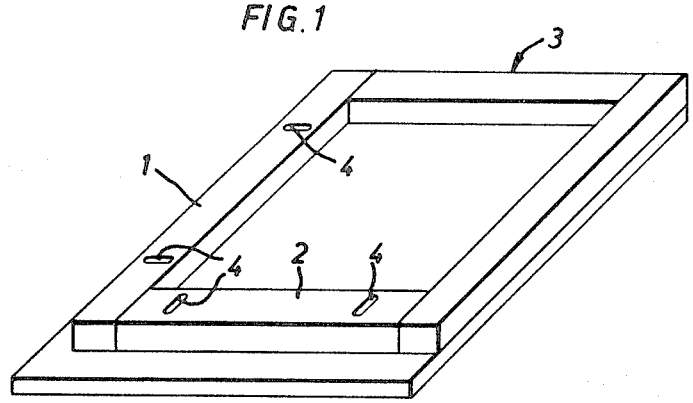
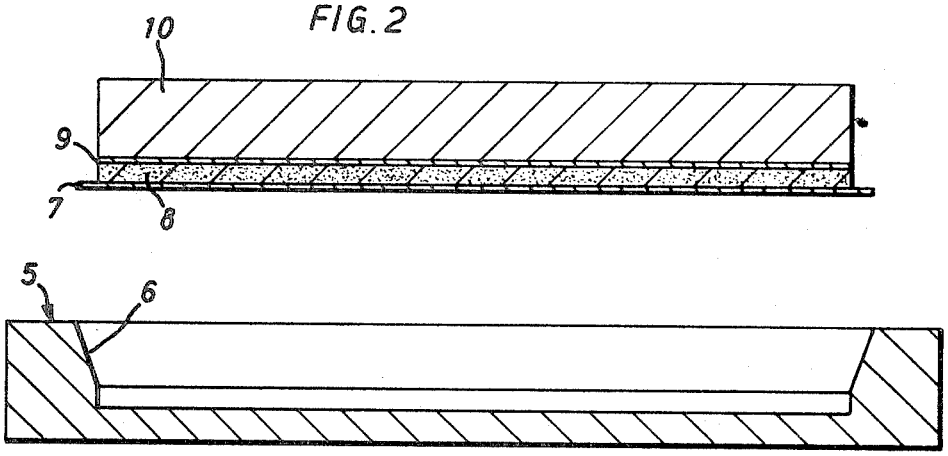

WALL-COVERING ELEMENTS

This invention relates to wall-covering elements and particularly to tiles of the type that are fixed to walls as decorative additions and/or protective additions.

According to the present invention, a wall-covering element comprises a core portion comprising a particulate filler material and a resinous binder, which binds the particles of the filler together, the proportion of filler material in the core being at least 65 percent by weight of the core, a facing layer comprising fibrous material bonded to the core over one face thereof and the sides thereof and a backing layer bonded to the other face of the core.

The wall-covering elements of the present invention consist, essentially, of a core portion which is relatively weak in itself since it is designed to comprise a major proportion of a particulate filler material bonded together with a resinous material, and the strength of the wall-covering element is mainly derived from the facing layer of fibrous material bonded to the core. The backing layer is provided to give additional strength to the element and to balance the facing layer to prevent warping of the element.

The core can be formed from any granular or particulate filler material such as sand, ground blast furnace slag, granite dust, ground limestone, ground pumice and the like, which is relatively inexpensive, and, preferably, the particle size of the granular or particulate material should be graded such that it passes through a 30-mesh British Standard sieve. This sieve aperture is not critical and may need adjustment to ensure that it does not cause grinning or telegraphing of the particles of filler material through the facing layer. Thus a thin facing layer may require the use of a material graded through a smaller aperture sieve while a thicker facing layer may allow the use of material graded through a larger aperture sieve. Preferably, the core consists of from 75 to 97.5 percent by weight of the granular or particulate filler material with the balance being the resinous material and any cross-linking agent or catalyst that it is desired to use. The resin employed for binding the particles together can be a thermosetting resin, examples of which are phenol-formaldehyde resins, urea-formaldehyde resins, epoxy resins and polyester resins. During the manufacture of the core it is often necessary to include in the composition a cross-linking agent or catalyst to promote cross-linking of the resin when this is heated to an elevated temperature. Such catalysts or cross-linking agents are well known and include amines, such as hexamethylene tetramine.

The facing layer extending over one face of the core and providing the face surface of the wall-covering element is a layer of fibrous material which can be a woven or nonwoven fabric such as paper or cloth, which can be embossed or flat and can be printed or can be woven to a design. The facing layer is preferably impregnated with a resinous material which is thermosetting or cross-linkable by heat or by chemical means, and typical resinous materials are melamine resins, urea-formaldehyde or other aldehyde resins, epoxy resins, polyesters, or polyurethanes. Preferably, the resinous material should be one that is resistant to hydrolysis by steam, especially where it is desired to use the wall-covering elements where they will be subject to water vapor or steam, such as in a kitchen or bathroom. Also, the resinous material employed in the facing layer should preferably confer on the facing layer a resistance to abrasion and scratching and, furthermore, should confer on the facing layer when in combination with the fibrous material, a sufficient strength to allow the wall-covering element to be handled easily during manufacture and positioning or application to the surface to be covered. In addition, the strength of the facing layer should be such as to withstand inadvertent or accidental blows which may be given to it during its use as a wall-covering element. Preferably therefore, the facing layer comprises a fibrous material and from 20 percent to 500 percent by weight of the resinous material based on the weight of the fibrous material. The resinous material chosen for use in the facing layer can be a clear resinous material when cured in order that any decorative pattern, either printed or woven in the fibrous material, can be seen. Alternatively, the resinous material can be colored so that it is complementary to colors already present in the fibrous layer to give the desired decorative appearance.

If desired, the wall-covering element can be provided with an overlay layer over the facing layer which can be a layer of paper which when impregnated with a resinous material similar to that used for the facing layer, becomes transparent and which can act as a protective surfacing for the facing layer.

The wall-covering element, as already stated, includes a backing layer which contributes to some extent, although it may be only slightly, to the strength of the wall-covering element but, in addition, it has the effect of stopping the wall-covering element warping due to any out-of-balance features that may be present in the element due to the presence of the facing layer. The backing layer can be also fibrous material, for example, paper or cloth which is impregnated with a resin in an amount sufficient only to secure adequate adhesion of the backing layer to the core.

The wall-covering element according to the present invention can be a variety of shapes, but preferably will be square or rectangular, having one face comprising the facing layer and other face comprising the backing layer. The sides of the element can be planar or can be cushioned by providing rounded edges. In most cases completely rounded edges along one or two adjacent sides in the way commonly known as RE and REX are not required, but if it is found that such edges are required they may be provided. For example, where corner tiles are to be used in exposed positions, one corner of the tile may be rounded in the way commonly known as REX. To ensure adequate strength and protection from damage, it is necessary that the sides of the element are covered by the facing layer and, for this reason, the facing layer extends from this surface of the element to cover the side surfaces of the core. Also by covering the sides of the element with the facing layer the mould in which the element is shaped and thermoset is protected from the highly abrasive core material.

According to a further aspect of the invention, a method for the preparation of a core for inclusion in a wall-covering element comprises mixing a particulate filler material with a finely divided thermosettable resinous binder, the filler material being present in an amount of at least 65 percent by weight of the core, heating a layer of desired thickness of the mixed filler and resinous material to melt the resinous material and cause the particles to adhere to one another without curing to a substantial extent the resinous material, and cooling.

According to the invention also, a method for the manufacture of a wall-covering element comprises taking a core as prepared in the immediately preceding paragraph and applying to the core a facing layer and a backing layer comprising a fibrous material and a resinous binder, and heating the assembly so obtained under pressure to consolidate it and to effect thermosetting of the resinous binders.

The core of the wall-covering element according to the present invention is often referred to as a "biscuit" and the method of formation of the core is particularly advantageous since it is such that the resinous binder is melted without curing to a substantial extent during formation of the core and prior to assembly of the core with the other element members and this permits a large layer of core material to be formed which can be then cut into the desired shape whilst still hot. The biscuit so obtained after cooling can be handled, although it is relatively weak, during the subsequent manufacturing processes and when final heating is effected when the core or biscuit has been assembled with the other members, the development of the full strength of the core takes place when the resinous material is converted to a thermoset state.

It has been found particularly advantageous to effect the heating of the filler material and the resinous binder by means of steam either saturated or superheated since this ensures an extremely efficient rapid heat transfer at a relatively low temperature, thereby minimizing the degree of curing of the resin.

It is sometimes found advantageous to effect a degree of cure in the "biscuit" before assembling with the other members and careful control of the degree of curing of the resin can be ensured by employing steam as the heating medium. Examination of the heated mixture indicates that the resinous material melts and coats or encapsulates the particles of filler material and thereby ensures that the particles are adhered together. It is also believed that during the heat treatment with steam some condensation may take place which causes the particles to come into close contact due to the surface tension of the water and the small size of the particles. The time of heat treatment depends to some extent on the type of resinous material being used but the time is relatively short and, for instance, can be up to 4 minutes. The steam can be used at a temperature of 100° C. or can be superheated to a temperature of, say, up to 130° C., and it has been found that by using, say, steam superheated to approximately 115° C., the core or biscuit so obtained was somewhat less friable than by using steam at a temperature of 100° C.

After formation of the core or biscuit which, as indicated, can be shaped to the desired size by cutting from a large sheet or, alternatively, by moulding initially in an open mould having the desired size, the facing layer and backing layer are assembled with the biscuit and the assembly is heated under pressure to effect final consolidation of the element and curing of the resinous binders used in all the members.

The facing layer of fibrous material can be formed by impregnating the chosen fibrous material, i.e. paper or cloth or other material, with a solution or dispersion of the desired resin which is in its nonthermoset state and this can be dried, for example in hot air. At this stage it is sometimes found advantageous to effect a partial cure of the resin, for example, in the case of melamine formaldehyde a partial cure is effected to reduce the reaction products formed when the resin is finally thermoset or cured.

The facing layer, after having been cut to shape and size is applied to the biscuit either before or after application of the backing layer which has similarly been treated with a resinous material prior to assembly with the biscuit. A number of different methods of application of the facing layer to the biscuit can be used. If desired, the facing layer after having been cut to size can be shaped so as to produce an open boxlike member having shallow sides, the sides having a depth equivalent to the thickness of the biscuit and the so-formed facing layer can be placed in a mold having moveable sides. The shaping of the facing layer into the open box member can be facilitated in a mold which is heated to a relatively low temperature, for example 50° C. which facilitates shaping of the facing layer without cracking taking place. Alternatively, or in addition to heating the mold, the flexibility of the facing layer can be increased by moistening with water or other suitable solvent those areas of the facing layer about which it is desired to shape the said layer. It is also possible if so desired to incorporate plasticizers into the resin of the facing layer to improve the flexibility and facilitate shaping the layer. A biscuit of the desired size is then placed within the open box facing layer and the backing layer laid on top of the biscuit. The mold sides are then closed to be a tight fit around the assembly within it and the mold placed in a press and heated under pressure to effect consolidation of the wall-covering element. Alternatively, the facing layer, biscuit and backing layer can be assembled without shaping of the facing layer around the sides of the biscuit, and the assembly placed into a mold of the desired size having the molding cavity shaped outwardly in order that when the assembly is placed within the mold, the shape of the molding cavity causes the edges of the facing layer to be bent around the sides of the biscuit.

An overlay paper can be assembled with the other members prior to molding and consolidated during the heating step. The overlay paper will be impregnated with a resin prior to assembly. The overlay paper can have a density of, for example, from 15 to 50 g./sq.m.

The temperature to which the assembly of facing layer, biscuit and backing layer is heated to effect consolidation of the element depends on the particular resins used, but usually will be within the range from 120° C. to 200° C. Molding pressures will depend on the type and amount of resin used in the core and facing and backing layers but will usually be in the range from 200 to 4,000 lb. per sq. in.

The density of the fibrous material used in the formation of the facing layer, in the case of the fibrous material being a paper layer, can be, for example, from 50 g./sq.m. to 200 g./sq.m. Usually, other fibrous materials employed will have the same density as that of the paper immediately previously referred to. The density of the fibrous material of the backing layer can similarly be from 50 g./sq.m. to 200 g./sq.m.

The invention is illustrated in the following examples. In the examples reference is made to the accompanying drawings in which:

FIG. 1 is a plan view of a mold having two adjustable sides, and

FIGS. 2 and 3 are an exploded section through an alternative type of mold.

EXAMPLE I

A 6-inch by 6-inch wall tile was made as follows:

A dry blend of sand and resin was made to the following formulation:

| | Parts by weight |
|---|---|
| Dry, sharp building sand all passing a 30 B.S. mesh sieve | 91.3 |
| Phenol-formaldehyde resin with a melting point of approximately 67° C. ground to a fineness of less than 0.5 percent on 240 B.S. mesh. | 8.0 |
| Hexamethylene tetramine powder. | 0.7 |

This mixture was uniformly spread on to a flat rubber surface to a depth of approximately five thirty-seconds inch and a width of approximately 7 inches. The loose mixture was sintered into a thermoplastic mass by exposing it to steam at 100° C. for three minutes and was then cut into a 6-inch by 6-inch square while it was still hot and plastic. On cooling, it set to a hard biscuit which could easily be handled. By examination under a low powered microscope it could readily be seen that the resin had melted and coated, or encapsulated, the grains of sand, subsequently sticking them together. The use of steam as the source of heat ensured rapid heat transfer at a relatively low temperature ensuring minimum precure of the resin.

The paper to form the outer faces of the sandwich were prepared as follows:

Surface laminating grade Kraft paper of 125 g./sq.m., suitably colored and printed was impregnated with an equal weight of a melamine-formaldehyde resin and dried to form the facing layer. Similarly, a natural shade laminating grade Kraft paper of 110 g./sq.m. substance was impregnated with an equal amount of the resin and dried to form the backing layer.

The impregnated surface laminating paper was trimmed to 6⅜ inches by 6⅜ inches and from each corner a small square three-sixteenths inch by three-sixteenths inch was cut. The impregnated natural shade laminating paper was trimmed to 6 inches by 6 inches. The edges of the impregnated surface laminating paper were formed through 90° by pressing it into a mold 6⅛ inches by 6⅛ inches by ¼ inch deep with a metal plate 6 inches by 6 inches in size. To soften the resin to facilitate shaping without cracking the paper the mould and metal plate were heated to approximately 50° C.

The three components, i.e. impregnated and formed surface laminating paper, biscuit and impregnated natural shade laminating paper were then moulded in a mould with two adjustable sides. This mould is shown in plan view in FIG. 1. Sides 1 and 2 of the mold 3 are adjustable and can be moved in and out to decrease and increase respectively the size of the mold. The sides can be held in their outermost or innermost positions or at any desired intermediate position by means of screws passing through slots 4. With the sides 1 and 2 in their outermost positions, the surface laminating paper was laid in the mould, patterned face down, with the formed edges turned upwards resembling an open box. The biscuit was laid in the box so formed and the natural shade laminating paper laid on the biscuit. The plunger, or top section of the mould (not shown in FIG. 1) was placed on the top of the natural shade laminating paper and the two sides 1 and 2 were screwed to their innermost position, making a square mold with 6 inches by 6 inches internal dimensions, and the plunger a good fit in the mold.

The mold was then transferred to a press and the components cured together under a pressure of 1 ton/sq. inch, i.e. 36 tons total load, for 3 minutes at a temperature of 150° C. The mold was then cooled and the tile removed.

EXAMPLE II

A tile was made as in example I except that a water-soluble urea-formaldehyde resin was used to bond the sand. Thus, a dry blend of sand and urea-formaldehyde resin was made to the following formulations:

|  | Parts by weight |
| --- | --- |
| Dry, sharp building sand all passing a 30 B.S. mesh sieve. | 90 |
| Spray dried Urea-formaldehyde resin powder. | 10 |
| Finely ground ammonium chloride | 0.006 |
| Finely ground Urea | 0.002 |
| Finely ground hexamethylene tetramine | 0.004 |

EXAMPLE III

A tile was made as in example I using a mold into which a pattern had been engraved approximately 0.010 inch deep, thus producing a tile with an embossed surface.

EXAMPLE IV

A tile was made as in example I except that the sand/resin mix was sintered in an air oven controlled at 200° C.

EXAMPLE V

A tile was made as in example I except that the following resins were substituted for the paper impregnating resin used therein:

a. Surface laminating paper facing layer—melamine/urea resin.

b. Natural shade laminating paper backing layer—phenol-formaldehyde resin.

EXAMPLE VI

A tile was made by first preparing a core (biscuit), a surface laminating paper and a natural shade laminating paper as described in example I. Instead of the mold with moving sides described in FIG. 1 a mold 5 with a deep internal draw 6 as shown in FIG. 3 was used.

With the mold heated to approximately 50° C., the impregnated surface laminating paper 7, pattern down, the biscuit 8 and the impregnated natural shade laminating paper 9 were located over the mold 5 as shown in FIG. 2 and the three components were pressed into the mold by the pressure plate 10, thus forming the surface laminating paper 7 around the sides of the biscuit 8 and filling the mold in one operation.

EXAMPLE VII

A tile was made as in example I except that the mold was modified to form small spacing pieces, commonly known as spacing lugs, on the sides of the tile.

EXAMPLE VIII

A tile was made as in example I except that a printed cotton fabric was used in place of the surface laminating paper of the facing layer. The fabric was impregnated with approximately 20 percent by weight of a melamine-formaldehyde resin and because of the natural stretch and flexibility of the cotton fabric was not necessary to remove the corners or to preform it into the shape of an open box.

EXAMPLE IX

To illustrate the effect of the facing layer on the strength of the tile, two tiles were produced as in example I except that one tile was faced with polyester film instead of the resin-impregnated Kraft paper. After cure the polyester film was removed from its tile leaving a cured "test" biscuit without any reinforcing surface.

The tile made as in example I and the "test" biscuit were cut into 1 inch wide strips and tested on an Instron Tensile Tester. The average loads recorded at break were as follows:

|  | Kg./inch width |
| --- | --- |
| Laminating-paper-faced tile | 12.1 |
| Molded "test" Biscuit without reinforcing facing layer | 4.1 |

EXAMPLE X

A biscuit suitable for use as the core of a wall tile was made as follows:

A dry blend of sand and resin of the formulation used in example I was uniformly spread on to a flat rubber surface as described in example I. This loose mixture was sintered into a thermoplastic mass by exposing it to superheated steam for 3 minutes and was then cut into a 6 inches by 6 inches square biscuit as described in example I.

The steam was superheated to approximately 115° C. but the temperature in the steam oven as measured by a mercury in glass thermometer rose to only 103° C. by the end of the 3 minute sintering period.

The biscuit made by this process was somewhat less friable then that made by the method using saturated steam at 100° C. described in example I.

EXAMPLE XI

In example I some difficulty was experienced in removing the biscuit from the rubber on which it had been sintered due to the resin adhering to the rubber. It was found that if the rubber was surfaced with a thin sheet of polytetrafluoroethylene the biscuit could readily be removed. Similarly, it was found that the biscuit could readily be removed from a thin sheet of paper or woven fabric.

Two types of paper were used although there is no indication that the process is limited to these papers.

a. Morse telegraph paper
b. Newsprint

It was found necessary to moisten the paper before use, otherwise it wrinkled on contact with the steam and produced a poor biscuit.

Organdie was chosen as the woven fabric and this was found to be equally as suitable as paper in effecting release from the biscuit. It was not necessary to moisten the organdie before use.

These three materials were found to be suitable for use with either saturated or superheated steam.

EXAMPLE XII

Biscuits suitable for use as cores of wall tiles were made as follows:

The dry blend of sand and resin described in example I was uniformly spread on to a sheet of low-quality paper to a depth of approximately three-sixteenth inch and a width of approximately 7 inches. The paper was then transferred to a metal plate heated to approximately 110° C. and put in a stem chamber for 1 minute. After one minute the biscuit was removed from the chamber, cut into 6-inch by 6-inch squares and allowed to cool.

Two biscuits were made by the method of this example. The first was made using saturated steam at 100° C. and the second using superheated steam at approximately 115° C.. Both biscuits were found to be satisfactory.

When compared with the methods described in examples I, X and XI the following advantages arose from the use of a hot base for supporting the resin/sand mixture during sintering.

a. The sintering time was reduced from 3 minutes to 1 minute.

b. Since the hot base was maintained above 100° C. no steam condensed on the paper and it was therefore unnecessary to moisten it to prevent it wrinkling as described in example XI.

c. Less steam condensed in the sand/resin mixture which resulted in a more uniform and stronger biscuit.

d. The biscuit could be handled more quickly after removal from the steam chamber.

EXAMPLE XIII

A tile was made as in example I except that a surface overlay paper was assembled with the other components.

A surface overlay paper of 25 g./sq.m. was impregnated with a solution of melamine-formaldehyde resin and dried, the weight of the dry resin being 150 percent of the weight of the paper. This impregnated paper was trimmed to 6 inches by 6 inches and assembled with the other components described in example I so as to cover the patterned face of the surface laminating paper. The components were then pressed as described in example I and the tile removed.

In a second and similar experiment the overlay paper was trimmed to the same size as the surface laminating paper, i.e. 6⅜ inches by 6⅜ inches and from each corner a small 3/16-inch square was cut out. This was then formed into a shallow box section in the same way as the surface laminating paper and assembled with the other components to cover the face and sides of the tile and pressed as described in example I.

EXAMPLE XIV

A biscuit suitable for use as the core of a wall tile was made to the following formulation:

|  | Parts by weight |
| --- | --- |
| Dry, sharp building sand all passing a 30 B.S. mesh sieve | 94.5 |
| Solid epoxy resin (m.p.—70° C.) ground to fine powder | 5.0 |
| Liquid curing agent | 0.5 |

The curing agent was first mixed and tumbled with the dry sand to ensure thorough dispersion of the agent throughout the sand. The finely ground epoxy resin was then added to the sand and uniformly blended with it to form a free flowing granular mixture. This mixture was then uniformly spread onto a sheet of paper and sintered in saturated steam as described in example XII. Biscuits 6 inches square were cut from the hot sintered mix, allowed to cool and used to make tiles by the process described in example VI.

Having now described my invention, what I claim is:

1. A wall tile comprising a core portion, a facing layer and a backing layer, said core portion comprising a particulate filler material and a resinous binder, which binds the particles of said filler material together, the proportion of filler material in said core being at least 65 percent by weight of said core, said facing layer comprising resin-impregnated fibrous material and being bonded to said core over one face thereof and the sides thereof and providing the main strength of the tile and said backing layer being bonded to the other face of said core.

2. A wall tile according to claim 1, in which said core consists of from 75 to 97.5 percent by weight of said particulate filler material.

3. A wall tile according to claim 1, in which said resinous binder is a thermosetting resin.

4. A wall tile according to claim 3, in which said resin is a phenol-formaldehyde or urea-formaldehyde resin.

5. A wall tile according to claim 3, in which said resin is an epoxy or polyester resin.

6. A wall tile according to claim 1, in which said facing layer is impregnated with a resinous material.

7. A wall tile according to claim 6, in which said facing layer is impregnated with a thermosetting or cross-linkable resinous material.

8. A wall tile according to claim 1, in which said backing layer is a fibrous material impregnated with a thermosetting or cross-linkable resinous material.

9. A wall tile according to claim 1 wherein said particulate filler passes through a 30-mesh British Standard sieve and comprises sand, ground blast furnace slag, granite dust, ground limestone, ground pumice and the like.

10. A wall tile according to claim 1 wherein said fibrous material is a woven or nonwoven fabric.

11. A wall tile according to claim 1 wherein said fibrous material is paper.

12. A wall tile according to claim 1 wherein said fibrous material is cloth.

13. A wall tile according to claim 11 wherein said paper has a density of from 50 g./sq.m. to 200 g./sq.m.

14. A wall tile according to claim 6 wherein said facing layer and said particulate filler material are bonded together by means of said resinous binder in said particulate filler material and said resinous material impregnated in said facing layer.

15. A wall tile according to claim 6 wherein the resinous material is present in an amount of from 20 to 500 percent by weight based on the weight of the fibrous material.

* * * * *